(12) United States Patent
Thaler et al.

(10) Patent No.: US 7,350,107 B2
(45) Date of Patent: Mar. 25, 2008

(54) METHOD AND APPARATUS FOR PERFORMING NETWORK DIAGNOSTICS

(75) Inventors: David G. Thaler, Redmond, WA (US); Alexandru Gavrilescu, Redmond, WA (US); Tin Qian, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 315 days.

(21) Appl. No.: 11/118,206

(22) Filed: Apr. 29, 2005

(65) Prior Publication Data
US 2006/0248389 A1   Nov. 2, 2006

(51) Int. Cl.
*G06F 11/00*   (2006.01)
(52) U.S. Cl. .................................. 714/26
(58) Field of Classification Search ........... 714/26, 714/43
See application file for complete search history.

(56) References Cited

U.S. PATENT DOCUMENTS

| | | | | |
|---|---|---|---|---|
| 6,029,258 | A * | 2/2000 | Ahmad | 714/46 |
| 6,446,136 | B1 * | 9/2002 | Pohlmann et al. | 719/318 |
| 6,473,659 | B1 * | 10/2002 | Shah et al. | 700/79 |
| 6,694,455 | B1 * | 2/2004 | Scrandis et al. | 714/31 |
| 6,789,257 | B1 * | 9/2004 | MacPhail | 719/316 |
| 6,892,330 | B2 * | 5/2005 | Lee | 714/48 |
| 7,103,806 | B1 * | 9/2006 | Horvitz | 714/43 |
| 7,197,561 | B1 * | 3/2007 | Lovy et al. | 709/224 |

OTHER PUBLICATIONS

David Thaler and Chinya V. Ravishankar. An architecture for inter-domain troubleshooting (extended version) <http://www.eecs.umich.edu/techreports/cse/1997/CSE-TR-344-97.pdf>. Technical Report CSE-TR-344-97, University of Michigan, Jul. 1997.
David Thaler and C. V. Ravishankar, "An architecture for Inter-Domain Troubleshooting" <http://research.microsoft.com/users/dthaler/Gdt97.pdf>, Proc. Sixth International Conference on Computers Communications and Networks, Las Vegas, Nevada, IEEE Computer Society Press, Sep. 1997.
David Thaler and Chinya V. Ravishankar. An Architecture for Inter-Domain Troubleshooting. J. Networks and System Management, 12(2): (2004).

* cited by examiner

*Primary Examiner*—Robert Beausoliel
*Assistant Examiner*—Amine Riad
(74) *Attorney, Agent, or Firm*—Marshall, Gerstein & Borun LLP

(57) ABSTRACT

A network diagnostics system allows determining a root cause for a network problem caused by a local or a remote component of the network, wherein the network diagnostic system may receive the symptoms of such a problem from an application. The network diagnostic system uses a plurality of helper classes, each of the plurality of helper classes providing diagnostic information about an object or a class of objects on the network. Moreover, the network diagnostic system may also use one or more extensible helper classes that are designed to receive information from third party helper classes.

20 Claims, 7 Drawing Sheets

METHOD AND APPARATUS FOR PERFORMING NETWORK DIAGNOSTICS

TECHNICAL FIELD

This patent relates generally to computer networking and more particularly to business application software using the Internet.

BACKGROUND

Modern day businesses cannot function efficiently without use of state of the art technology. Specifically, computers and software are an almost essential part of most of the businesses in developed economies. Computers are increasingly becoming interconnected at higher and higher levels through networking technologies. The Internet is currently the most visible manifestation of this trend. However, smaller scale networks, however, are also becoming more widespread. With the proliferation and wide spread use of computer applications, intranets, the Internet, and corporate networks, performance of networks have become an important factor determining the overall performance of computing systems using these networks and thus affecting the businesses using these computing systems.

Networking is one of the most complicated areas to configure, manage and diagnose, which is often reflected in poor end user satisfaction numbers, slow network performance, etc. Networks generally have a stack architecture where components function at different levels. Each component relies on the components functioning at lower layers to provide functionality to components sitting on the higher layers. Failure of a component at a certain layer affects all the components in the stack sitting above it. Conversely, overuse of a component can affect components in the stack sitting below it. While many operating system network components in the networking stack do their own diagnosis, each of them deals only with errors regarding their own components. Therefore, users of a network are left with the task of understanding the interrelationships between all the networking components affecting the performance of a given layer, which quite often proves to be very hard and frustrating.

Work to date in network management and troubleshooting has concentrated generally on effectively managing a single network. Typically, it has also been assumed that the network management software and the managed devices are all owned by the same administration. However, in today's complex networks there is a need for coordinated network management across various administrative domains. For example, while a majority of network routing problems can be identified as software and configuration errors, a significant number of network routing problems are often classified as "somebody else's problem" where each party involved ends up pointing to the other party as the root cause. Such problems are generally quite difficult to solve and involve a fair amount of coordination among various networks.

A second important problem with current network diagnostic systems is the communication of the problem and solutions to various parties related to the problem. It is quite often possible that the true cause of any problem may be distant from its effect. For example, failure to access a web page may be a result of a problem located anywhere between a user's browser and a remote server. In such cases it is important that once the cause of the problem has been identified, information about such a problem can be conveyed to the affected and interested third party along with any troubleshooting information, such as estimated time of repair, etc. Moreover, such troubleshooting and communication about it needs to work even when there is at least some problem in the communication network.

SUMMARY

A network diagnostics system allows determining a root cause for a network problem caused by a local or a remote component of the network, wherein the network diagnostic system may receive the symptoms of such a problem from an application. The network diagnostic system uses a plurality of helper classes, each of the plurality of helper classes providing diagnostic information about an object or a class of objects on the network. Moreover, the network diagnostic system may also use one or more extensible helper classes that are designed to receive information from third party helper classes.

An implementation of the network diagnostic system allows providing network diagnosis using one of a plurality of channels. For example, the network diagnostic system may use a wireless application programming interface (API) to connect a network diagnostic engine to a remote network diagnostic engine using a wireless network when other channels of communications are not available.

Yet another implementation of the network diagnostic system may also store historical information related to various helper classes and their relations to various occurrences of problem instances and use such relationships to provide diagnostic information in response to future occurrences of such problem instances.

An alternate implementation of the network diagnostic system includes a method of providing helper class extensions, the method includes defining an extensible helper class, adding metadata defining the extensible helper class to a helper class list of the network diagnostic system, receiving a problem instance related to an object, performing a best match lookup in the helper class list in response to the problem instance, finding the extensible helper class addressing the problem instance, dynamically determining object attributes further defining the problem instance, adding the further defining object attributes to the problem instance and repeating the best match lookup to find a new helper class for the problem instance.

An alternate implementation of the network diagnostic system includes a method of providing one of a plurality of channels to load a third party helper class and a method of selecting one of the plurality of channels to communicate with other network diagnostic systems or with other network objects. An implementation of such a network diagnostic system may use a strict prioritization method for selecting one of the plurality of channels. The plurality of channels used by such a network diagnostic system may include a wireless communication channel; a landline communication channel; a digital subscriber line based communication channel; a cable based communication channel, etc.

BRIEF DESCRIPTION OF DRAWINGS

The present patent is illustrated by way of examples and not limitations in the accompanying figures, in which like references indicate similar elements, and in which.

DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Network

Figure 1:
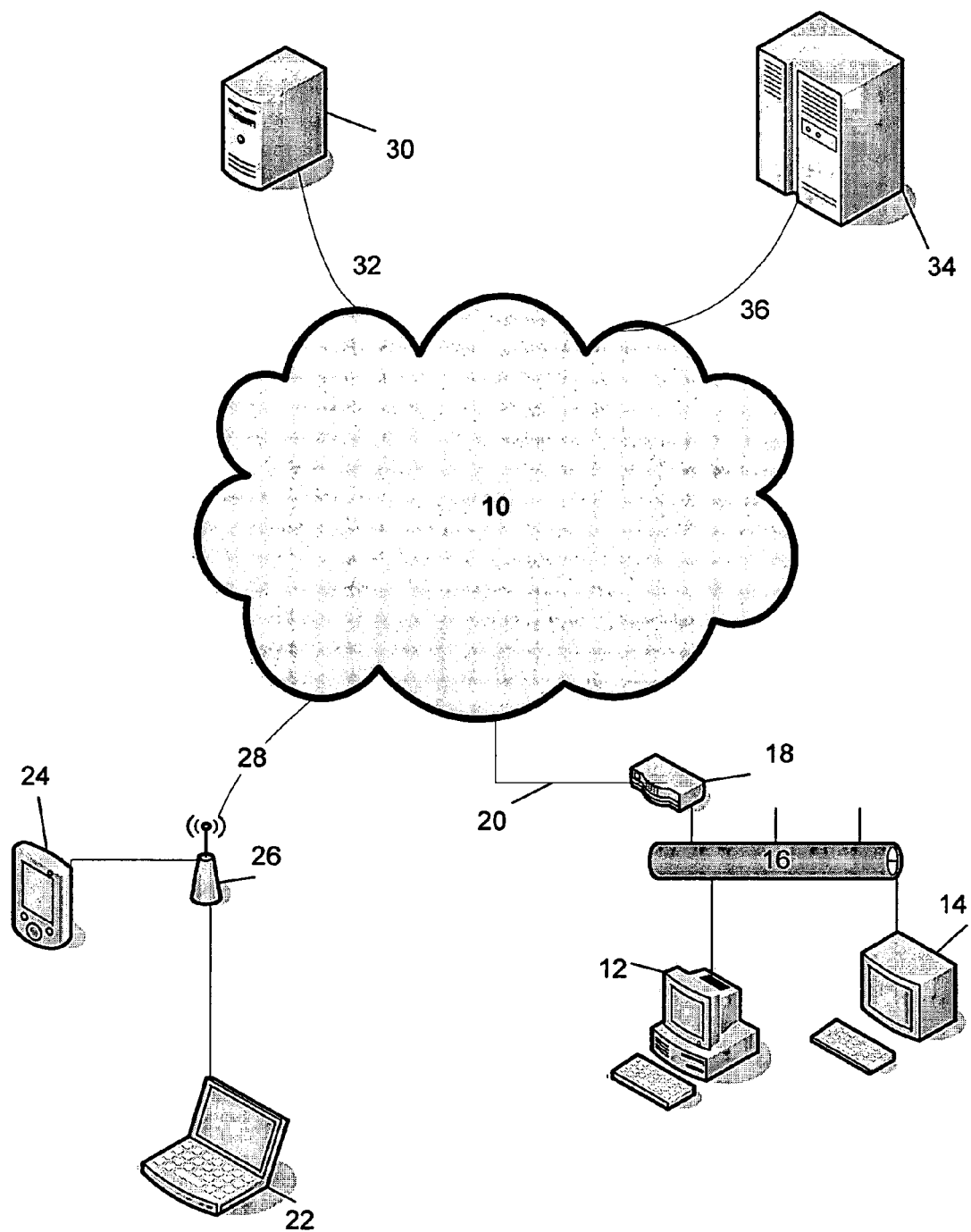
FIG. 1 is a block diagram of a network interconnecting a plurality of computing resources.

FIG. 1 illustrates a network 10 that may be used to implement a network diagnostics system described herein. The network 10 may be the Internet, a virtual private network (VPN), or any other network that allows one or more computers, communication devices, databases, etc., to be communicatively connected to each other. The network 10 may be connected to a personal computer 12 and a computer terminal 14 via an Ethernet 16 and a router 18, and a landline 20. On the other hand, the network 10 may be wirelessly connected to a laptop computer 22 and a personal data assistant 24 via a wireless communication station 26 and a wireless link 28. Similarly, a server 30 may be connected to the network 10 using a communication link 32 and a mainframe 34 may be connected to the network 10 using another communication link 36. As it will be described below in further detail, one or more components of a network diagnostic system may be stored on any of the various devices connected to the network 10.

Computer

Figure 2:
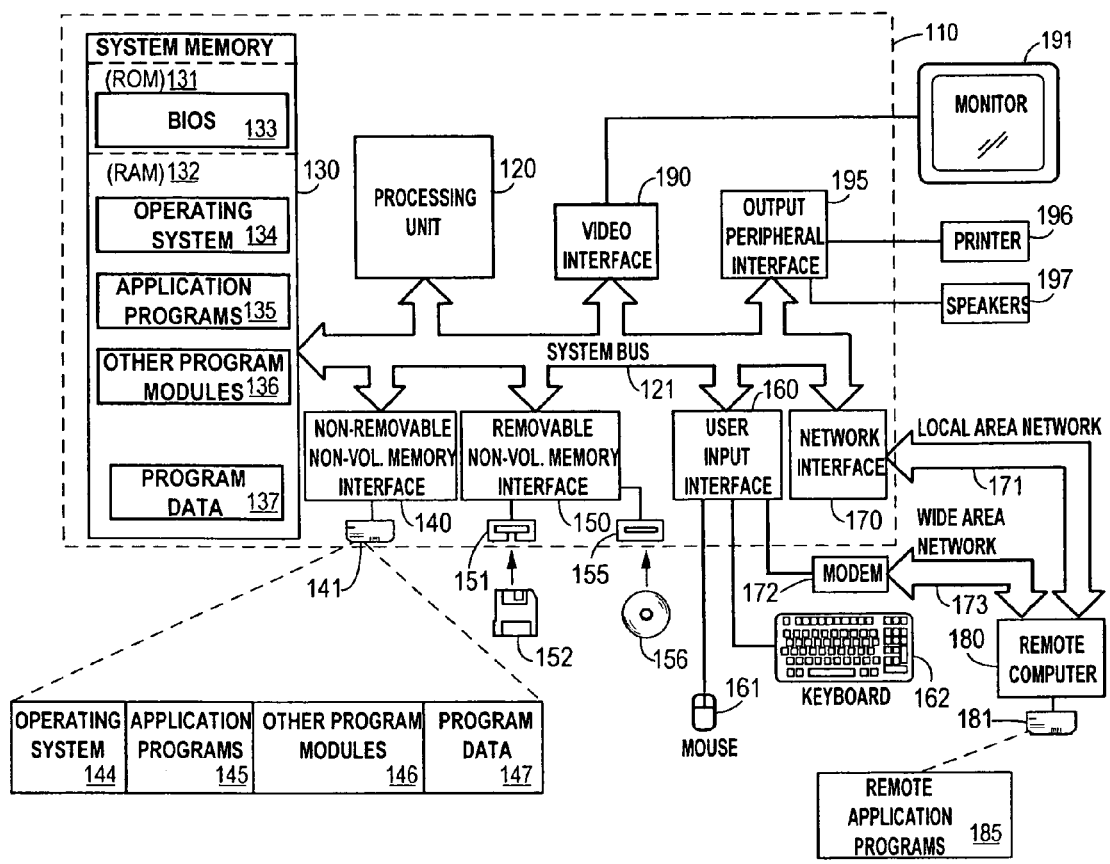
FIG. 2 is a block diagram of a computer that may be connected to the network of FIG. 1.

FIG. 2 illustrates a computing device in the form of a computer 110 that may be connected to the network 10 and used to implement one or more components of the network diagnostic system. Components of the computer 110 may include, but are not limited to, a processing unit 120, a system memory 130, and a system bus 121 that couples various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

Network Diagnostic System

Figure 3:
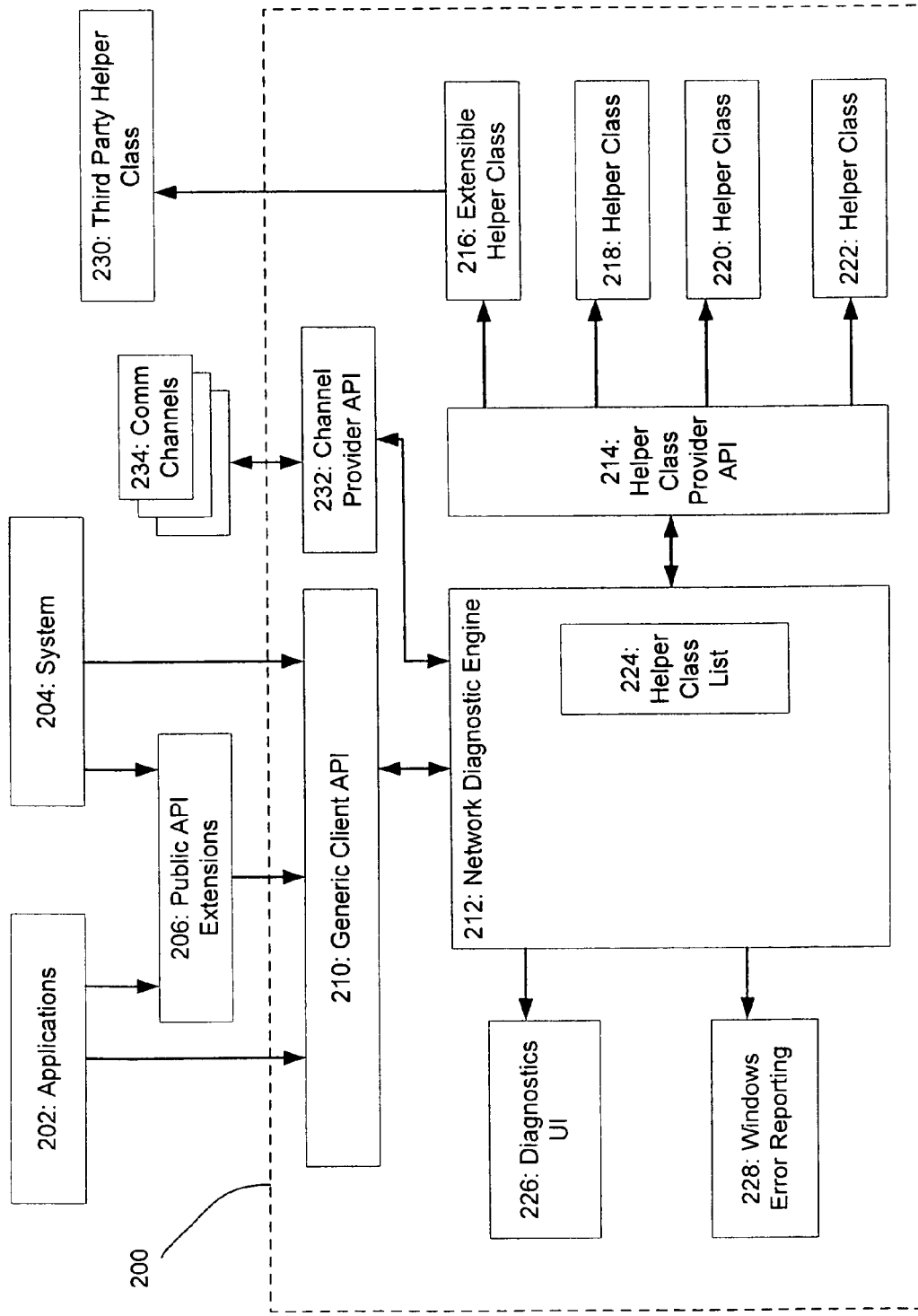
FIG. 3 illustrates a schematic diagram of a network diagnostic system.

FIG. 3 illustrates a schematic diagram of network diagnostic system 200 that may be used to provide diagnostic services to a network, such as the network 10 or a plurality of interconnected networks. The network diagnostic system 200 may be designed on a single network server or a computer such as the computer 110. Alternatively, various components of the network diagnostic system 200 may be designed in a distributed framework over several computers. As shown in FIG. 3, the network diagnostic system 200 may communicate with one or more applications 202 and systems 204. The network diagnostic system 200 may communicate with the applications 202 and the system 204 using a plurality of public application programming interface (API) extensions 206. An example implementation of the public API extensions 206 is explained in further detail in FIG. 5 below. Alternatively, the network diagnostic system 200 may communicate with the applications 202 and the systems 204 directly as well.

The network diagnostic system 200 may include a generic client API 210 that communicates with the applications 202, with the system 204, with the public API extensions 206, etc., to receive problem instances. The network diagnostic system 200 may include a network diagnostic engine 212 responsible for analyzing the problem instance received at the generic client API 210. The network diagnostic engine 212 may communicate with a plurality of helper classes 216-222 using a helper class provider API 214. The helper class provider API 214 may provide a uniform interface for the network diagnostic engine 212 to interact with various helper classes 216-222. Typically, the helper class provider API 214 is adapted to identify an object specified by the problem instance and to invoke various plugins based on the object. Each of the various plugins invoked by the helper class provider API 214 may contain a collection of helper classes, such as the helper classes 216-222 and which are further described below.

Each of the plurality of helper classes 216-222 may be designed to include plug-in code for an object or a class of objects. Additionally, each of the helper classes 216-222 may diagnose and/or repair one or more functional aspects of an object or a class of objects. It should be noted that the term object is used herein to denote a logical entity in the network or a local network protocol stack such as a router, a stream of data, a network component, etc., while the term class of objects denotes a class of a specific type of objects. For example, a Transmission Control Protocol (TCP) session may be a class, whereas an instance of that class may be identified by a pair of Internet Protocol (IP) addresses and port numbers participating in that TCP session. Typically, helper classes 216-222 may use lower layer APIs such as a Windows® Management Instrumentations API, etc., to access specific parameters useful for diagnosis of related objects.

Providing helper classes with high granularity allows the network diagnostic system 200 to provide network diagnosis with a higher resolution or depth. For example, instead of providing just a generic helper class dealing with all the routers in the network 10, if individual helper classes are provided for each of various types or vendors of routers, such granularity may allow the network diagnostic system 200 to use type-specific or vendor-specific data to help diagnose the problem instance.

The network diagnostic engine 212 may be provided with a helper class list 224 which may store, among other things, a listing of all helper classes known to the network diagnostic engine 212. One or more of the various helper classes 216-222 may be an extensible helper class, meaning that these helper classes are designed to provide the network diagnostic engine 212 with extensibility where needed and desired. Such extensible helper classes may be marked as such in the helper class list. The implementation illustrated in FIG. 3 is shown to have the helper class 216 as an extensible helper class. Specifically, the extensible helper class 216 may be designed to invoke an extension with a third party helper class 230. Generally, the third party helper class 230 may be designed to run locally on a computer hosting the network diagnostic system 200. However, in an implementation of the network diagnostic system 200, the third party helper class 230 may communicate with an external network that may be contributing to the causation of the problem instance. In an alternate implementation, the extensible helper class 216 may be designed to look up a network component and validate that it has been extended by a third party, pass a set of parameters about the network component back to the network diagnostic engine 212 and let the network diagnostic engine 212 invoke the third party helper class 230. The functioning of the extensible helper class 216 and the third party helper class 230 is illustrated in further detail in FIG. 6 below.

The network diagnostic system 200 may also include a diagnostic user interface (UI) 228 that allows users to interact with the network diagnostic system 200. For example, once the network diagnostic system 200 finds one or more root causes for a problem instance, the network diagnostic system 200 may send information regarding such root causes to the diagnostic UI 226. The diagnostic UI 226 may display the root cause and any related error message on an output device, such as a monitor for the user. In alternate implementations, the diagnostics UI 226 may be invoked by the generic client API by the public API extensions 206 or even by the applications 202 or the system 204. Furthermore, the network diagnostic system 200 may also include a Windows® error reporting module 228, which may report the root cause to an appropriate error processing and/or reporting module within a Windows® system.

Additionally, the network diagnostic system 200 may also include a channel provider API 232 that may allow the network diagnostic engine 212 to communicate with remote instances of other similar network diagnostic engines. For example, the channel provider API 232 may select a communication channel from a plurality of communication channels 234 to be used by the network diagnostic engine 212 to communicate with other network diagnostic systems or with other network objects. Specifically, when there are a number of channels 234 available to the network diagnostic engine 212, such as a landline, a wireless channel, a DSL channel, etc., the channel provider API 232 may select the best channel to use for communications. The channel provider API 232 may select the best channel using a best mode selection method, such as a strict prioritization logic, etc.

Figure 4:
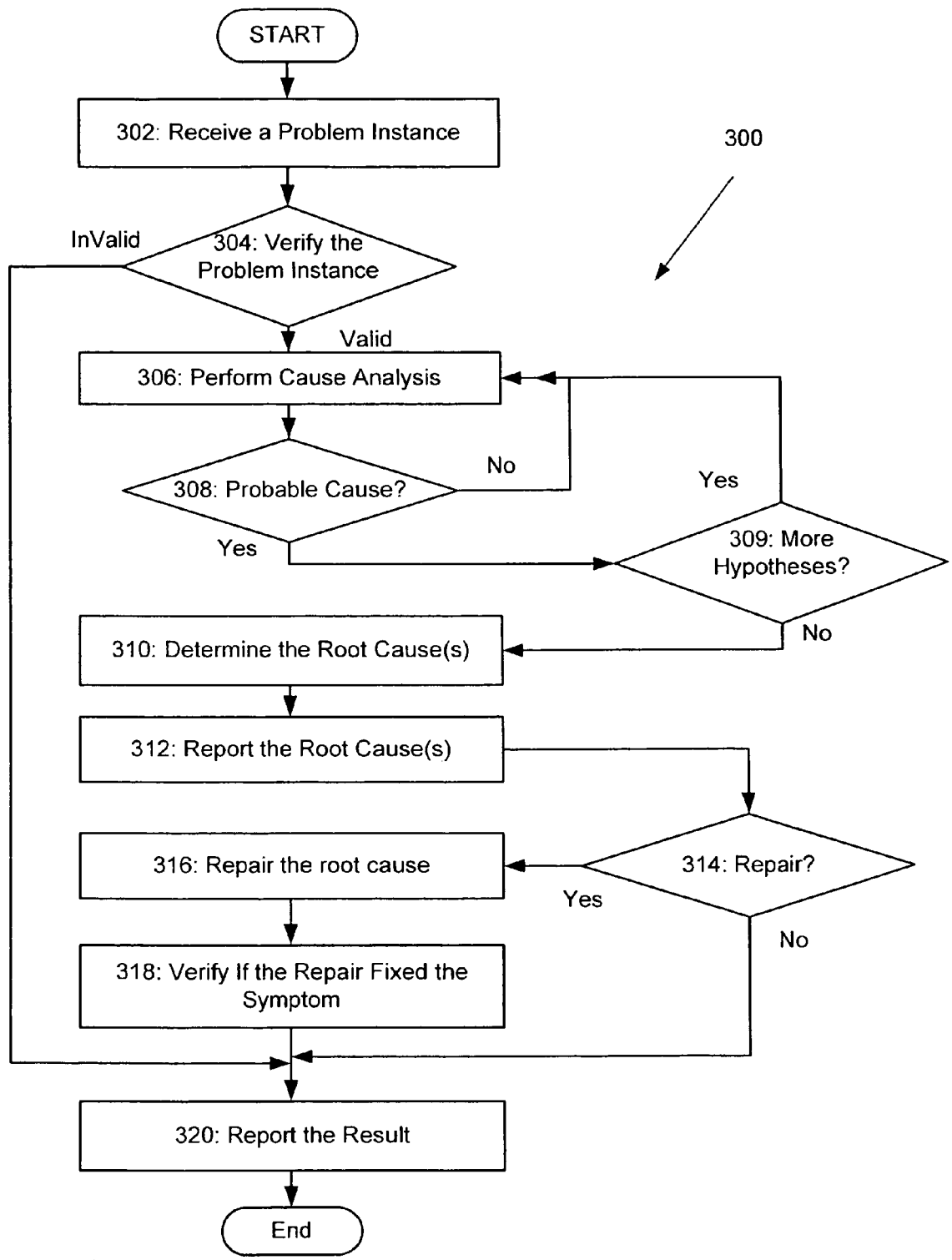
FIG. 4 illustrates a flowchart of the functioning of the network diagnostic system illustrated in FIG. 3.

FIG. 4 illustrates a flowchart of an exemplary implementation of a network diagnosis program 300 that may be used by the network diagnostic system 200 for providing network diagnostic information to the application 202 or the system 204. The network diagnosis program 300 may be implemented as software, hardware, firmware or any combination thereof. When implemented as software, the network diagnosis program 300 may be stored on the ROM 131, the RAM 132 or any other memory device used by the computer 110 used to implement the network diagnostic system 200.

At a block 302, the generic client API 210 receives a problem instance from either the application 202 or the system 204. Such a problem instance may be generated automatically by the application 202 or the system 204 in response to a problem encountered by them, or, alternatively, a user of the application 202 or the system 204 may generate the problem instance using a user interface. Typically, the problem instance received at the network diagnostic system 200 may identify an object that is perceived to be the cause of the problem instance. The network diagnostic engine 212 creates an active problem in an unconfirmed state.

Upon receiving the problem instance, at a block 304 the network diagnostic engine 212 may attempt to verify the existence of the problem instance. The network diagnostic engine 212 may query a helper class appropriate for the object provided in the problem instance to verify the problem instance. In an alternate implementation of the network diagnostic system 200, the verification of the problem instance may be deferred until a later time. If the problem instance is not verified, the network diagnostic system 200 rejects the problem instance and the control moves to a block 320 which reports the problem instance as invalid.

Once the validity of the problem instance is verified, at a block 306, the network diagnostic engine 212 performs a root cause analysis to determine the probable causes for the problem instance. As part of the root cause analysis, the helper class appropriate for the object provided by the problem instance, which also verified the problem instance at the block 304, proposes a set of hypotheses about probable causes for the problem instance. Subsequently, a block 308 evaluates each of the proposed hypotheses to see if it is a valid hypothesis for a potential cause for the problem instance. The block 308 evaluates the proposed hypothesis using a helper class appropriate for an object identified in the proposed hypothesis and in a manner similar to the analysis performed by the block 304. If a particular hypothesis is not considered to be valid, that particular hypothesis is rejected.

Subsequently a block 309 determines if there are any additional hypotheses that may need to be evaluated as a potential cause of the problem instance. If it is determined that there are more potential hypotheses that need to be evaluated, the control is transferred back to the block 306. Thus, it may be possible that a problem instance may have multiple valid causes, as identified by multiple valid hypotheses, in which case each of such valid hypotheses is evaluated independently. While the network diagnosis program 300 is evaluating each of the various potential hypotheses in a sequential manner, in an alternate embodiment, each of the various potential hypotheses may also be evaluated in a parallel or simultaneous manner.

If a proposed hypothesis is confirmed to be a cause, such a proposed hypothesis is further evaluated in the same manner as the original problem instance. Thus, for any confirmed hypothesis, a plurality of potential sub-hypotheses is considered to further define the cause of the original problem instance. For any sub-hypothesis that is confirmed to be a cause, further analysis of its sub-hypotheses may be performed. For a particular proposed hypothesis that was confirmed to be a cause, if no sub-hypothesis is confirmed, at a block 310, that particular hypothesis may itself be identified to be a root cause.

Subsequently a block 312 reports the root causes identified by the block 310 to the network diagnostic engine 212. The network diagnostic engine 212 may in turn report such root causes to the generic client API 210, to the diagnostic UI 226, and/or to the windows® error reporting module 228.

Once a hypothesis is identified and reported as a root cause, a block 314 may determine if the network diagnostic system 200 is going to repair the root cause or not. In some situation(s), it may be sufficient to identify and report the root cause for a problem instance, or it may not be possible for the network diagnostic engine 212 to repair the identified root cause. In such an instance, the block 314 may determine that the network diagnostic system 200 is not going to repair the root cause. If it is determined that a particular root cause is not going to be repaired, the network diagnostic engine 212 may ask appropriate helper classes, which may have verified causes other than the root causes, to propose one or more workaround solutions. Workaround solutions proposed by such helper classes may use objects related to such verified non-root causes. Alternatively, the network diagnostic engine 212 may also defer repairing the root cause for a later time.

If it is determined that the root cause is going to be repaired, at a block 316, the network diagnostic engine 212 may call one or more necessary routines of the particular helper class that verified the problem instance to repair the root cause. Subsequently, a block 318 verifies if the repair performed by the block 316 has fixed the symptom caused by the problem instance or not. At a block 320 the network diagnostic engine 212 may report the repair, as well as whether the repair fixed the symptom caused by the problem instance, to the diagnostic UI 226 and/or to the Windows® error reporting module 228.

Figure 5:
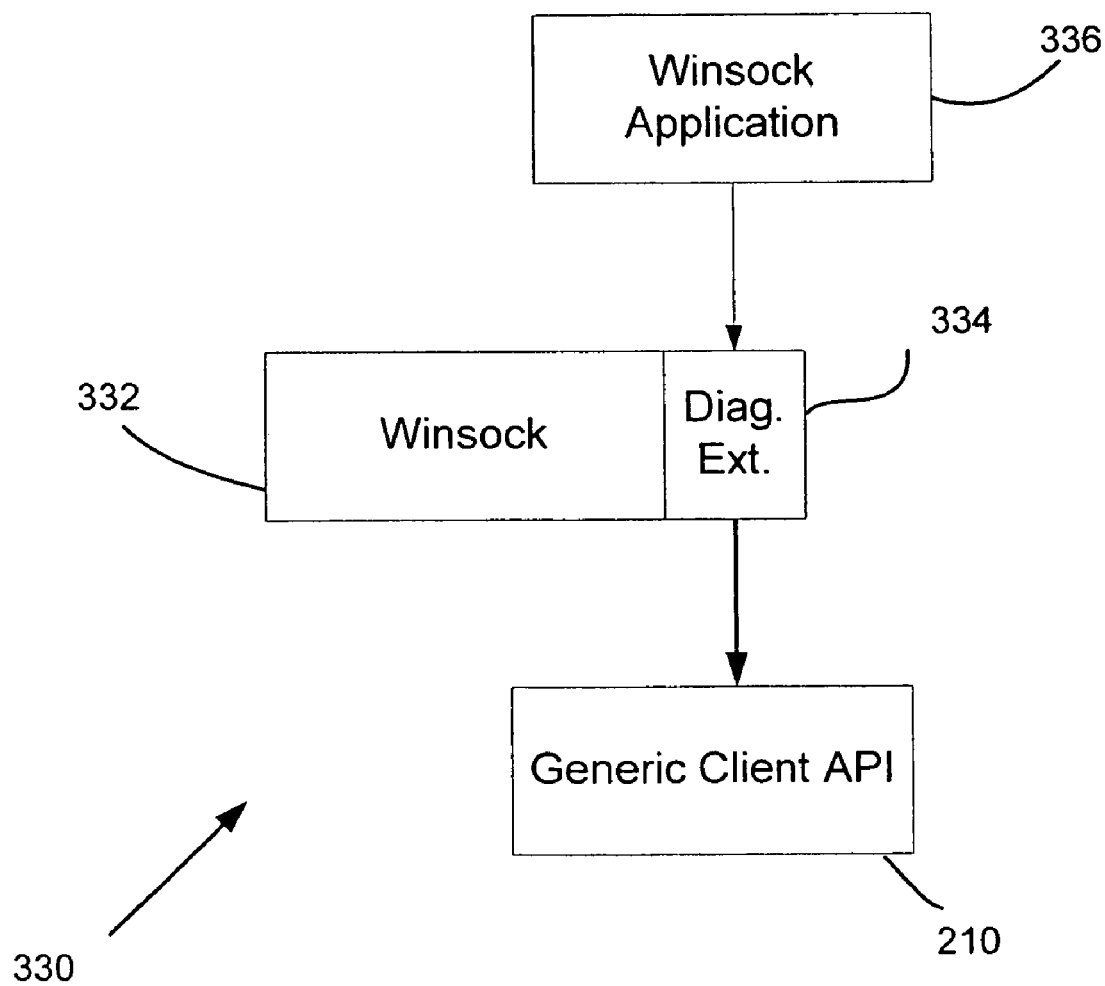
FIG. 5 is a schematic diagram illustrating the functioning of a public application programming interface extension used by the network diagnostic system illustrated in FIG. 3.

FIG. 5 illustrates a block diagram of a public API extension framework 330 illustrating the use of the public API extensions 206 with the network diagnostic system 200. Using a public API, extensions may be provided for various commonly used application or system APIs, such as APIs used for file management, remote procedure call (RPC), peer-to-peer applications, Winsock, WinInet, etc.

As shown in FIG. 5, an implementation of the public API extension framework 330 may include a Winsock API 332 having a diagnostic extension 334 that is adapted to communicate with a WinSock application 336 and with the generic client API 210. Note that while the exemplary illustration of FIG. 5 includes a Winsock API 132, other commonly used public APIs, such as a WinInet API for an HTTP application, may also be used. Because the diagnostic extension 334 is added at the public API level, the diagnostic extension 334 does not have to be provided with all the parameters from an application, such as the Winsock application 336. Thus the public API extension framework 330 allows various caller applications to communicate with the network diagnostic system 200 with fewer parameters and therefore enables applications to provide a better networking experience to the end users. Because the diagnostic extension 334 is integrated into public APIs, such as the Winsock API 332, it also allows seamless programming to developers on a network using the network diagnostic system 200.

Figure 6:
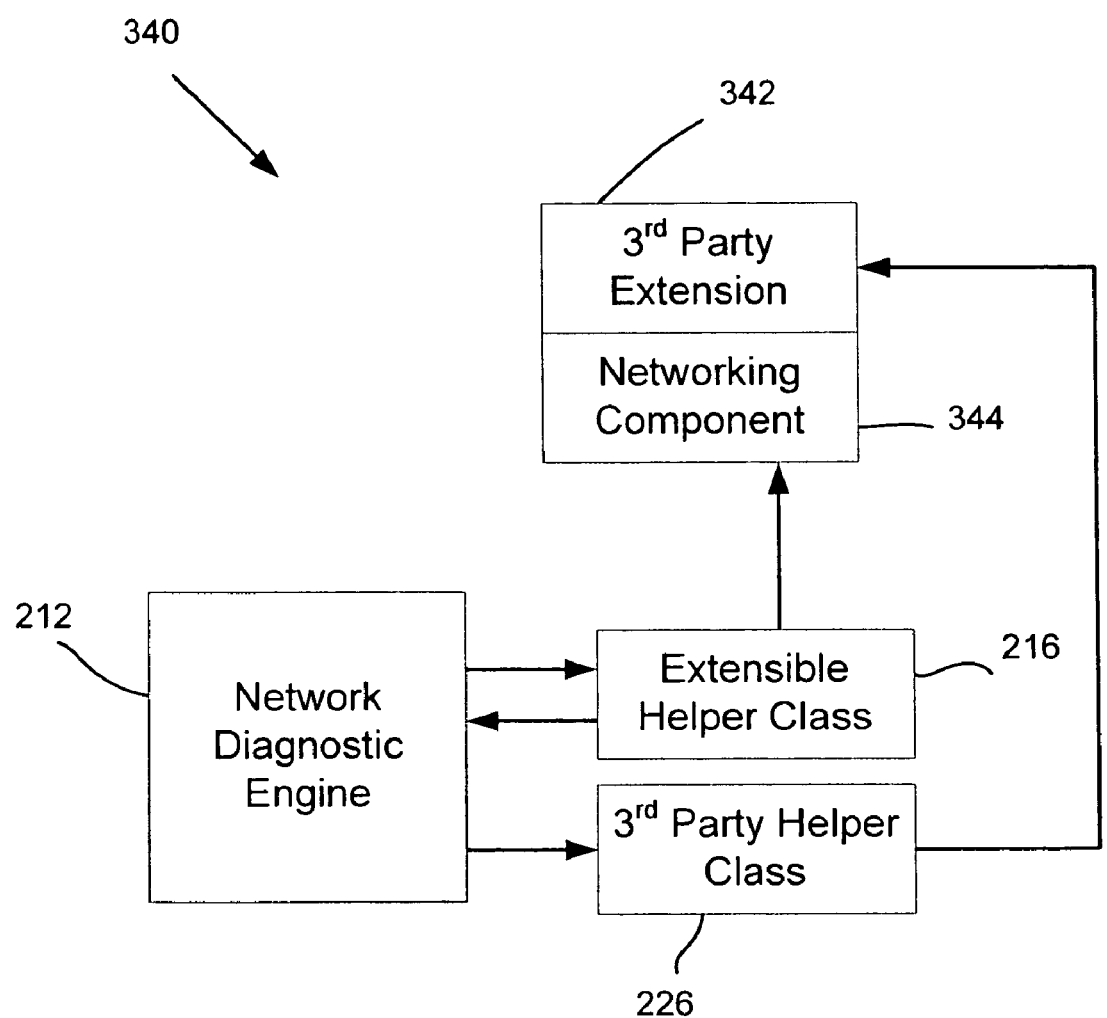
FIG. 6 illustrates a schematic diagram illustrating the functioning of extensible helper classes used by the network diagnostic system illustrated in FIG. 3.

FIG. 6 illustrates a block diagram of an extensible helper class framework 340 illustrating the functioning of the extensible helper classes, such as the extensible helper class 216, in providing extensibility to the network diagnostic system 200. The extensible helper class 216 may be responsible for determining the parameters to be used when invoking a third party helper class, such as the third party helper class 226. The extensible helper class 216 may also be designed to evaluate a call from the network diagnostic engine 212 to determine which, if any, third party helper class needs to be invoked.

During a typical operation of the extensible helper class framework 340, the network diagnostic engine 212 may call the extensible helper class 216 as part of a root cause analysis for a problem instance. As part of the call from the network diagnostic engine 212, the extensible helper class 216 may also receive one or more attributes of an object. The extensible helper class 216 may consult a networking component 344 as identified in the problem instance to get additional/augmented parameters about that networking component and return such additional components to the network diagnostic engine 212. Subsequently, the network diagnostic engine 212 may perform the helper class lookup with the newer, augmented list of parameters, as provided by the component. The network diagnostic engine 212 may choose a new helper class as a result of the new lookup, and in some instances such a new helper class may be a third party helper class 226. Thus the third party helper class 226 may register with the network diagnostic engine 212 for problem instances that are identified by a specific value of one or more augmented parameters.

Alternatively, the extensible helper class 216 may evaluate the attributes provided by the network diagnostic engine 212 and consult a networking component 344 as identified in the problem instance to get additional/augmented parameters about the networking component 344. Additionally, the extensible helper class 216 may select a third party helper class 230 to be invoked and return it to the network diagnostic engine 212. Subsequently, the network diagnostic engine 212 may invoke the third party helper class 226, which may use the third party extension 342 for diagnostic purposes.

For example, if the network diagnostic engine 212 may call an extensible helper class 216, wherein the extensible helper class 216 is an interface class. Subsequently, the extensible helper class 216 may consult a RAS interface as identified in the problem instance to get additional/augmented parameters about that RAS interface and return such additional components to the network diagnostic engine 212. Subsequently, the network diagnostic engine 212 may perform the helper class lookup with the newer/augmented list of parameters, as provided by the RAS interface. The network diagnostic engine 212 may choose a new helper class as a result of the new lookup, such as an L2TP interface helper class, where such an L2TP interface helper class may be a third party helper class 226.

Figure 7:
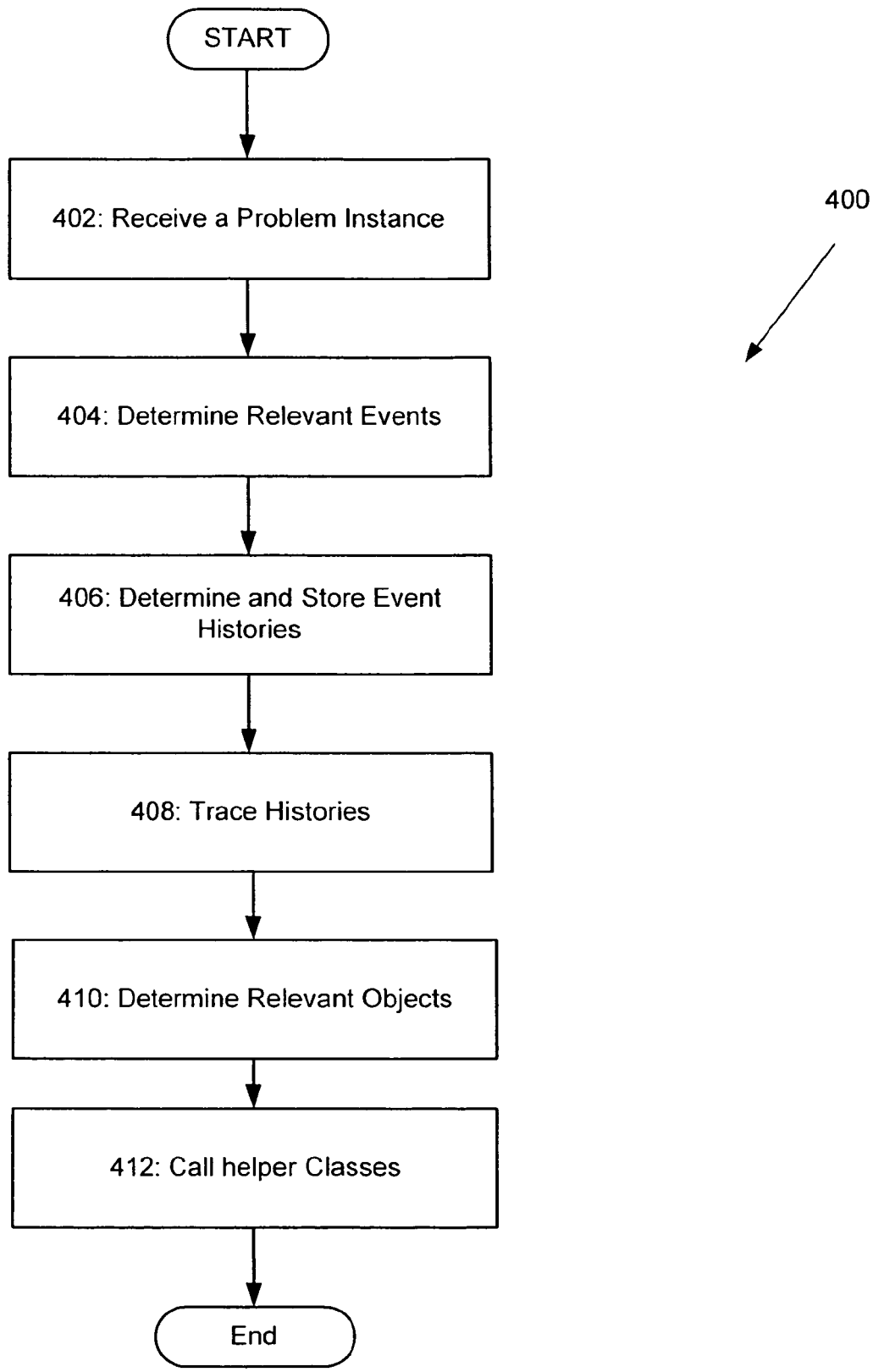
FIG. 7 is a schematic diagram illustrating the functioning of a lifetime data isolation program used by the network diagnostic system illustrated in FIG. 3.

FIG. 7 illustrates a flowchart of a lifetime diagnostic data isolation program 400 that may be used by the network diagnostic system 200. Proper functioning of a communication network involves proper functioning of a number of different components on the communication network. Each of such various components may have a temporal aspect attached to it. Thus, the present condition of a component, and therefore, of a network is generally a function of various past events affecting each of the various components of the network. In other words, the various networking components may have temporal dependencies on each other and FIG. 7 illustrates how such dependencies may be used by the network diagnostic system 200.

The lifetime diagnostic data isolation program 400 allows the network diagnostic system 200 to analyze the temporal data related to various components of the network and to isolate events and data that are relevant for determining a root cause for a problem instance received by the network diagnostic system 200.

At a block 402, the lifetime diagnostic data isolation program 400 may receive a problem instance. The problem instance may specify components and parameters related to the problem instance. An example of such a problem instance may be that a browser is not able to connect to a web page. The problem instance will provide various parameters such as the URL for the web page, the time of the request for the web page, etc.

At a block 404, the lifetime diagnostic data isolation program 400 may determine all the events that may potentially be the cause for the problem instance. In the case of the above mentioned example, the various events may include, a DNS lookup, creating a socket, binding to the socket, connecting to the destination, etc.

At a block 406, the lifetime diagnostic data isolation program 400 may determine the histories of each of the events identified at the block 404 and store the historical information. For example, the program 400 may store the time of receipt of an IP address for the web page, the time at which the socket was created, the time at which it was disconnected, etc.

Subsequently, using the histories of all the events involved, at a block 408 the lifetime diagnostic data isolation program 400 may trace back from the moment of the generation of the problem instance to determine what events may need to be further analyzed. For example, by analyzing the history, the lifetime diagnostic data isolation program 400 may determine that when the browser tried to connect to the web page, the socket was already created, in which case, the program 400 may need to determine the time of an interface connection/disconnection between the browser and the IP address.

At a block 410, the lifetime diagnostic data isolation program 400 may determine various components/objects that may be relevant to the events that are identified as the cause of the problem instance and at a block 412 may call helper classes for these objects. Thus, in the example discussed here, the program lifetime diagnostic data isolation 400 may call an interface helper class to diagnose any potential problems with the interface. As one of ordinary skill in the art can see, because of the isolation of the problem provided by analyzing the temporal histories of various events related to the problem instance, the program 400 allows the network diagnostic system to determine with higher probability, the potential root cause for a problem instance.

Although the forgoing text sets forth a detailed description of numerous different embodiments of the invention, it should be understood that the scope of the invention is defined by the words of the claims set forth at the end of this patent. The detailed description is to be construed as exemplary only and does not describe every possible embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

What is claimed is:

1. A method of providing helper class extensions for a network diagnostic system, the method comprising:
defining an extensible helper class;
adding metadata defining the extensible helper class to a helper class list of the network diagnostic system;
receiving a problem instance related to an object;
performing a first best match lookup in the helper class list in response to the problem instance based on a first set of object attributes;
finding the extensible helper class addressing the problem instance;
initiating the extensible helper class to dynamically determine a second set of object attributes further defining the problem instance;
adding the further defining second set of object attributes to the problem instance; and
performing a second best match lookup using the further defining second set of object attributes to find a new helper class for the problem instance.

2. A method of claim 1, further comprising loading a third party helper class based on the further defining second set of object attributes.

3. A method of claim 2, wherein the network diagnostic system uses a public application programming interface extension to communicate with an application.

4. A method of claim 2, wherein the problem instance includes user identifying information and wherein the extensible helper class uses the user identifying information in determining the second set of object attributes further defining the problem instance.

5. A method of claim 2, further comprising:
sending the further defining second set of object attributes to a diagnostic user interface;
generating an error message at the diagnostic user interface using the further defining second set of object attributes; and
sending the error message to a client application that generated the problem instance.

6. A method of claim 2, further comprising maintaining helper class statistics relating a plurality of problem instances to a plurality of helper classes.

7. A method of claim 2, further comprising storing a plurality of problem instances occurring in the last specified period and corresponding helper classes in a cache.

8. A method of claim 2, further comprising storing a relationship between the user defining information and various attributes of the problem instance.

9. A method of claim 2, further comprising:
determining a plurality of events related to the problem instance;
receiving temporal state information for the plurality of events; and
analyzing the temporal state information to isolate a potential root cause event for the problem instance.

10. A method of claim 9, further comprising:
determining a plurality of root cause event objects related to the potential root cause event; and
invoking a plurality of helper classes related to the plurality of root cause event objects.

11. A method of providing helper classes for a network diagnostic system, the method comprising:
defining a helper class;
adding metadata defining the helper class to a helper class list of the network diagnostic system;
receiving a problem instance;
performing a first best match lookup in the helper class list in response to the problem instance based on a first set of object attributes;

finding the extensible helper class addressing the problem instance; initiating the extensible helper class to determine a second set of object attributes further defining the problem instance; and selecting a best communication channel from a plurality of communication channels to communicate to an object defined by the further defining second set of object attributes.

12. A method of claim 11, further comprising communicating with the object using the best communication channel.

13. A method of claim 11, further comprising communicating with another network diagnostic system using the best communication channel, the another network diagnostic system having a permission to access the object.

14. A method of claim 11, wherein selecting the best communication channel uses at least one of a strict prioritization logic and a first to work logic routine to select the best communication channel.

15. A method of claim 11, wherein the plurality of channels includes at least one of: (1) a wireless communication channel; (2) a landline communication channel; (3) a digital subscriber line communication channel; and (4) a cable based communication channel.

16. A network diagnostic system for providing helper class extensions, the system comprising:

an extensible class definition module adapted to define an extensible helper class;

a helper class list including metadata that indicates a first set of object attributes for the extensible helper class;

a generic client API adapted to receive a problem instance related to an object;

a best match lookup module adapted to analyze the helper class list in response to the problem instance to find the extensible helper class addressing the problem instance based on the first set of object attributes;

wherein the extensible helper class includes an object attributes determination module adapted to dynamically determine a second set of object attributes further defining the problem instance, an object attribute addition module adapted to add the further defining second set of object attributes to the problem instance; and a new helper class definition module adapted to perform a best match lookup using the further defining second set of object attributes to find a new helper class for the problem instance.

17. A network diagnostic system of claim 16, further comprising a public application programming interface extension to communicate with an application.

18. A network diagnostic system of claim 16, further comprising a third party helper class addition module adapted to load a third party helper class corresponding the new helper class.

19. A network diagnostic system of claim 16, further comprising a helper class statistics storage module adapted to store relationships between a plurality of problem instances and a plurality of helper classes.

20. A network diagnostic system of claim 16, further comprising a channel provider application programming interface adapted to select a best mode communication channel to connect to an object identified by the helper class.

\* \* \* \* \*